US012745890B1

(12) United States Patent
Mobley et al.

(10) Patent No.: US 12,745,890 B1
(45) Date of Patent: Sep. 29, 2026

(54) GRILL BRUSH WITH SCOURING PAD AND SCRAPER

(71) Applicant: Grill Rescue LLC, Boca Raton, FL (US)

(72) Inventors: Scott Jacob Mobley, Boca Raton, FL (US); Anthony Tranchida, Boca Raton, FL (US); Dylan Demnard, Boca Raton, FL (US)

(73) Assignee: Grill Rescue LLC, Boca Raton, FL (US)

( * ) Notice: Subject to any disclaimer, the term of this patent is extended or adjusted under 35 U.S.C. 154(b) by 0 days.

(21) Appl. No.: 19/367,935

(22) Filed: Oct. 24, 2025

(51) Int. Cl.

| | |
|---|---|
| ***A47L 13/34*** | (2006.01) |
| ***A47J 37/07*** | (2006.01) |
| ***A47L 13/022*** | (2006.01) |
| ***A47L 13/08*** | (2006.01) |
| ***A47L 13/12*** | (2006.01) |
| ***A47L 17/06*** | (2006.01) |

(52) U.S. Cl.
CPC ........... *A47L 13/34* (2013.01); *A47J 37/0786* (2013.01); *A47L 13/022* (2013.01); *A47L 13/08* (2013.01); *A47L 13/12* (2013.01); *A47L 17/06* (2013.01)

(58) Field of Classification Search
CPC .... A47J 37/0786; A47L 13/08; A47L 13/022; A47L 13/02; A47L 13/07; A47L 13/12; A47L 13/16; A47L 13/34; A47L 17/06; A47L 17/08
See application file for complete search history.

(56) References Cited

U.S. PATENT DOCUMENTS

| | | | | |
|---|---|---|---|---|
| 6,216,306 | B1 * | 4/2001 | Esterson | A46B 7/04 D4/118 |
| 10,932,643 | B2 * | 3/2021 | Omotola | A47L 13/08 |
| 11,759,083 | B2 * | 9/2023 | Sousa | A47L 13/03 15/104.93 |
| 12,048,372 | B2 * | 7/2024 | Cherry | A46B 5/00 |
| 2023/0000239 | A1 * | 1/2023 | Cira | B08B 1/165 |

* cited by examiner

*Primary Examiner* — Laura C Guidotti
(74) *Attorney, Agent, or Firm* — Kilpatrick Townsend & Stockton LLP

(57) ABSTRACT

A grill brush can be used to clean a surface of a grill such as a grill grate. The grill brush can include a bristle-free scouring pad and a rigid scraper. The bristle-free scouring pad and the rigid scraper may be located on a grill brush head of the grill brush. The bristle-free scouring pad may be arranged relative to the rigid scraper to allow simultaneous contact of both the bristle-free scouring pad and the rigid scraper with the surface of the grill during use.

10 Claims, 14 Drawing Sheets

GRILL BRUSH WITH SCOURING PAD AND SCRAPER

FIELD OF THE DISCLOSURE

According to certain embodiments of this disclosure, there is provided a grill brush for cleaning a grill grate with a scouring pad and a scraper simultaneously.

BACKGROUND

Grill brushes using a bristle-free scouring pad have become popular alternatives to traditional wire brush grill brushes. Bristle-free scouring pads provide a safer option that wire brushes, allow for steam cleaning of the grill grate, and are extremely durable. However, there remains room for improvement. For instance, while bristle-free scouring pads are very effective at removing most undesirable material from a grill grate, there is the possibility that extremely burned on materials may remain.

SUMMARY

According to certain embodiments, a grill brush can include a bristle-free scouring pad and a rigid scraper. The bristle-free scouring pad can be arranged relative to the rigid scraper to allow simultaneous contact of both the bristle-free scouring pad and the rigid scraper with a grill grate during use.

In some embodiments, both the bristle-free scouring pad and the rigid scraper can be located on an underside of the grill brush. Additionally, or alternatively, the bristle-free scouring pad can at least partially surround the rigid scraper. Additionally, or alternatively, the bristle-free scouring pad can at least partially surround two or more sides of the rigid scraper. Additionally, or alternatively, the bristle-free scouring pad can surround four sides of the rigid scraper.

In some embodiments, the bristle-free scouring pad can be formed at least partially from an aramid cloth. Additionally, or alternatively, the bristle-free scouring pad can include a cavity, and the rigid scraper can be positioned within the cavity. Additionally, or alternatively, the rigid scraper can include a support at least partially located in the cavity, and the rigid scraper can additionally include a set of rigid discs mounted on the support. Additionally, or alternatively, at least some of the rigid discs can be movable relative to adjacent rigid discs, and the rigid discs can be metal discs.

In some embodiments, the bristle-free scouring pad can be compressible. Additionally, or alternatively, the grill brush can include a handle and a grill brush head removably attached to the handle, and the grill brush head can include the bristle-free scouring pad and the rigid scraper. Additionally, or alternatively, the grill brush can additionally include a grill brush handle coupled with the grill brush head, Additionally, or alternatively, the grill brush handle can include a grip end and an elongated shaft, and the grip end can have a first thickness that is larger than a second thickness of the elongated shaft. Additionally, or alternatively, a lower-most part of the rigid scraper may be approximately coplanar with a lower-most part of the bristle-free scouring pad.

According to certain embodiments, a grill brush can include a bristle-free scouring pad and a rigid scraper. The bristle-free scouring pad may be arranged relative to the rigid scraper to allow simultaneous contact of both the bristle-free scouring pad and the rigid scraper with a grill grate during use. The bristle-free scouring pad can include a cavity, and the rigid scraper can be positioned within the cavity.

In some embodiments, both the bristle-free scouring pad and the rigid scraper can be located on an underside of the grill brush. Additionally, or alternatively, the bristle-free scouring pad can at least partially surround two or more sides of the rigid scraper. Additionally, or alternatively, the bristle-free scouring pad may surround four sides of the rigid scraper. Additionally, or alternatively, the bristle-free scouring pad may be formed at least partially from an aramid cloth.

In some embodiments, the rigid scraper can include a support at least partially located in the cavity, and the rigid scraper can additionally include a set of rigid discs mounted on the support. Additionally, or alternatively, at least some of the rigid discs can be movable relative to adjacent rigid discs, and wherein the rigid discs are metal discs. Additionally, or alternatively, the bristle-free scouring pad can be compressible.

In some embodiments, the grill brush can include a handle and a grill brush head removably attached to the handle. The grill brush head can include the bristle-free scouring pad and the rigid scraper. Additionally, or alternatively, the grill brush can additionally include a grill brush handle coupled with the grill brush head. The grill brush handle can include a grip end and an elongated shaft, and the grip end can have a first thickness that is larger than a second thickness of the elongated shaft. Additionally, or alternatively, a lower-most part of the rigid scraper can be approximately coplanar with a lower-most part of the bristle-free scouring pad.

According to certain embodiments, a grill brush can include a handle, a bristle-free scouring pad coupled with the handle, and a rigid scraper. The bristle-free scouring pad can be arranged relative to the rigid scraper to allow simultaneous contact of both the bristle-free scouring pad and the rigid scraper with a grill grate during use.

In some embodiments, both the bristle-free scouring pad and the rigid scraper can be located on an underside of the grill brush. The bristle-free scouring pad can at least partially surround the rigid scraper, and the bristle-free scouring pad can at least partially surround two or more sides of the rigid scraper. Additionally, or alternatively, the bristle-free scouring pad can surround four sides of the rigid scraper. Additionally, or alternatively, the bristle-free scouring pad can include a cavity, and the rigid scraper can be positioned within the cavity. The rigid scraper can include a support at least partially located in the cavity. The rigid scraper can additionally include a set of rigid discs mounted on the support, and at least some of the rigid discs can be movable relative to adjacent rigid discs.

In some embodiments, the bristle-free scouring pad can be compressible. Additionally, or alternatively, the handle can include a grip end and an elongated shaft, and the grip end can have a first thickness that is larger than a second thickness of the elongated shaft. Additionally, or alternatively, a lower-most part of the rigid scraper can be approximately coplanar with a lower-most part of the bristle-free scouring pad.

The terms “invention,” “the invention,” “this invention” “the present invention,” “disclosure,” “the disclosure,” and “the present disclosure,” used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary, not the drawings, and not the detailed description. This summary is a high-level overview of various aspects of the invention and introduces some of the concepts that are further described in the detailed description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

DETAILED DESCRIPTION

Figure 1:
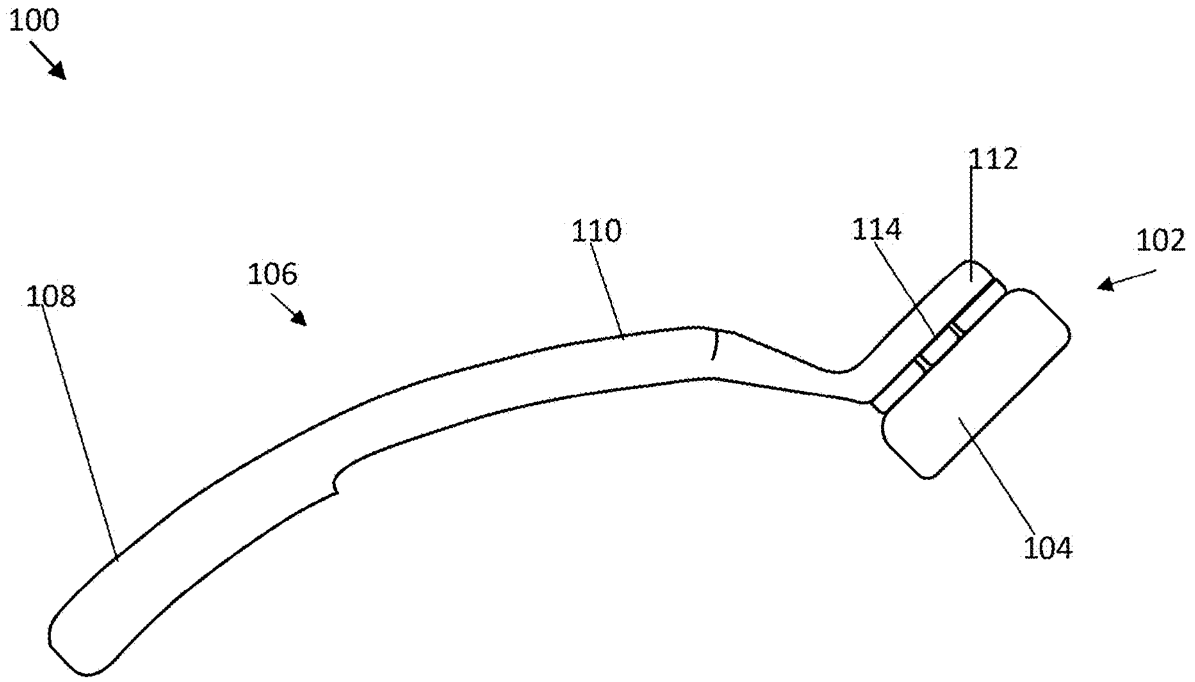
FIG. 1 is a side view of a grill brush with a grill brush head that can include a scouring pad and a scraper according to certain aspects of the present disclosure.

Embodiments of the present disclosure provide a grill brush that can include a grill brush head with a scouring pad and a scraper. The scouring pad may be formed from a bristle-free material and may be positioned on a first side of the grill brush head. Additionally, or alternatively, the scraper may be formed from a metallic or otherwise hard material and may be positioned on the first side of the grill brush head. The scraper may be formed from multiple metallic components and may serve as an abrasive cleaning surface. The scouring pad may serve as a softer surface to clean different material than the scraper from a grill surface. Using a combination of the scouring pad and the scraper, which may be simultaneously contact the grill surface with the scouring pad, can clean the grill surface, such as a grill grate, faster, more efficiently, and more completely than other grill brushes. In some examples, a handle may extend from a second side of the grill brush head to allow manipulation of the grill brush head during cleaning.

In some examples, the grill brush head can be used to clean a grill or any suitable surface of a grill such as a grill grate. For example, the grill brush head can be applied to a rack or the grate of the grill to clean food particulates, contaminants, particles containing food-borne illnesses, and the like from the rack of the grill. In some examples, a combination of the scouring pad and the scraper can be used to provide cleaning capabilities for the grill brush. For example, the scouring pad and the scraper may be positioned on a common side of the grill brush head and may be arranged to simultaneously contact the grill, or any surface thereof, while the grill brush is used to clean the grill.

In some examples, the scouring pad may be compressible or soft, and the scraper may be hard or rigid. When the grill brush is applied to the surface of the grill, pressure may be applied from the grill brush to the surface of the grill, and the pressure may cause the scouring pad to compress to bring the scraper in contact with the surface of the grill simultaneously with the scouring pad. In other examples, the scouring pad may not be compressible, and a bottom-most portion of the scouring pad and a bottom-most portion of the scraper may be located at approximately the same position to allow the scouring pad and the scraper to simultaneously contact the surface of the grill. Additionally, or alternatively, the scraper may include several individual components, such as rigid discs, that are movable relative to one another to allow a greater surface area of the surface of the grill to be cleaned.

Using the grill brush to clean the surface of the grill by simultaneously contacting the scouring pad and the scraper to the surface of the grill provides various benefits over other grill brushes that do not include the scouring pad and the scraper. In a particular example, a user of a grill can apply a grill brush head of the grill brush to the surface of the grill. Applying the grill brush head can involve applying pressure from the grill brush to the surface of the grill and moving forward-and-backward or side-to-side to clean the surface of the grill. By applying pressure from the grill brush to the surface of the grill, the scouring pad can compress and allow the scouring pad and the scraper to simultaneously contact the surface of the grill during the forward-and-backward motion or the side-to-side motion. The scouring pad and the scraper may have a different hardness, a different compressibility, a different surface roughness, and the like, and, due to the differences, the scouring pad and the scraper may be configured to clean different contaminants and/or different surface areas. For example, the scraper may be harder and more rigid than the scouring pad and may be configured to clean baked-on food particulates that may stick to the surface of the grill by abrasively scraping the surface of the grill with the scraper. Additionally, or alternatively, the scouring pad may be softer and more compressible than the scraper and may be configured to clean residual oils or soft food particulates that may stick to the surface of the grill by scrubbing the surface of the grill with the scouring pad. Simultaneously using the scraper and the scouring pad can allow a more complete and efficient cleaning of the surface of the grill with a single tool.

In some examples, the grill brush can include a grill brush head that can include a bristle-free scouring pad and a rigid scraper. The bristle-free scouring pad can be made from a compressible, soft, or relatively soft material, such as an aramid cloth or other similar material, that can be used for cleaning at least a portion of the grill. The rigid scraper can be made from a material harder than or more rigid than the bristle-free scouring pad. In some examples, the bristle-free scouring pad and the rigid scraper can be located on an underside of the grill brush. Additionally, or alternatively, the bristle-free scouring pad can at least partially surround the rigid scraper. For example, the bristle-free scouring pad may partially surround two or more sides of the rigid scraper, may surround four sides of the rigid scraper, or may surround any other suitable number of sides of the rigid scraper.

In some examples, the bristle-free scouring pad can be located on an underside of the grill brush and can form a cavity in which the rigid scraper can be located. For example, the cavity can have appropriate dimensions, such as a length, a width, a depth, to allow the rigid scraper to be positioned within the cavity. Being positioned in the cavity may allow the rigid scraper to be used simultaneously with the bristle-free scouring pad such as by simultaneously contacting a surface of the grill along with the bristle-free scouring pad.

In some examples, the rigid scraper can include a support that can be at least partially located within the cavity formed by the bristle-free scouring pad. The support can be or include a U-shaped rod or other support feature that can support a set of rigid discs. The rigid discs may be moved relative to other, such as adjacent, rigid discs, and at least one of the rigid discs can be formed from a metal or a metal alloy. In some examples, a lower-most part of the rigid scraper, or the rigid discs thereof, can be approximately coplanar with a lower-most part of the bristle-free scouring pad. Additionally, or alternatively, the scraper may be slightly inset or slightly protruding from the scouring pad, for example since the scouring pad may be compressible. By approximately being coplanar, the rigid scraper and the scouring pad can interact with the grill, or a grate thereof, at the same time.

In some examples, the grill brush can include a handle that can be removably attached to the grill brush head. That is, the grill brush head can be removed from the grill brush handle, and a different grill brush head can be attached to the grill brush handle. The grill brush handle can include an interaction feature and a rod feature. The interaction feature may be configured to be handled by a hand or other manipulator such as a robotic manipulator. The rod feature may extend from the interaction feature to a connection point between the grill brush handle and the grill brush head for coupling the grill brush head with the grill brush handle. The interaction feature can have a first thickness that is larger than a second thickness of the rod feature.

FIG. 1 is a side view of a grill brush 100 with a grill brush head 102 that can include a scouring pad 104 and a scraper according to certain aspects of the present disclosure. As illustrated in FIG. 1, the grill brush 100 can additionally include a grill brush handle 106 that can receive the grill brush head 102. The grill brush handle 106 can include a grip end 108, an elongated shaft 110, a head connecting end 112, other suitable features, or any combination thereof. The grip end 108 may be sized or otherwise arranged to allow manipulation of the grill brush 100. For example, the grip end 108 may be sized to be gripped or otherwise handled. The elongated shaft 110 may extend from the grip end 108 to the head connecting end 112 or to the grill brush head 102. In some embodiments, the elongated shaft 110 may have a diameter or a thickness that is smaller than a diameter or a thickness of the grip end 108.

The head connecting end 112 may enable coupling between the grill brush head 102 and the grill brush handle 106. For example, a set of clips, such as clip 114, may allow the grill brush head 102 to be easily removed from the head connecting end 112 such as to allow a different grill brush head to be attached to the grill brush handle 106. The head connecting end 112 may allow the grill brush head 102 to be at least indirectly used by manipulating the grip end 108 of the grill brush handle 106. Using the grill brush head 102 can include simultaneously contacting the scouring pad 104 and the scraper to a surface of a grill. The surface of the grill can include a grill grate or other suitable surface.

Figure 2:
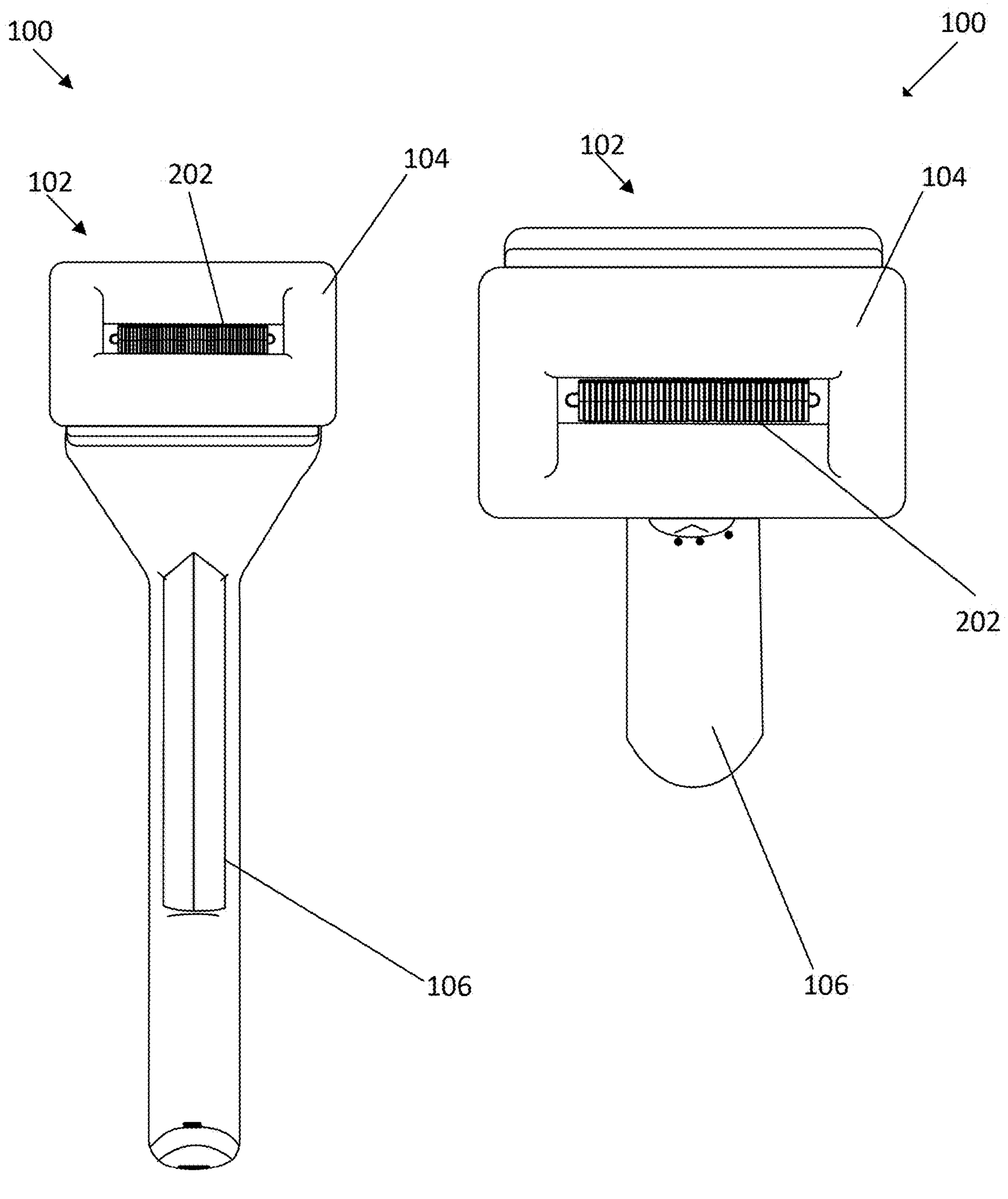
FIG. 2 is a set of bottom views of the grill brush of FIG. 1.

FIG. 2 is a set of bottom views of the grill brush 100. For example, FIG. 2 illustrates the grill brush head 102 and the grill brush handle 106 from a bottom perspective. As illustrated in FIG. 2, the grill brush head 102 can include the scouring pad 104 and the scraper 202. The scouring pad 104 may be formed from a bristle-free material such as an aramid cloth or other similar or suitable material. In some examples, the scouring pad 104 may be compressible or otherwise soft to allow cleaning of certain materials from the surface of the grill. The scraper 202 can be formed from a rigid material such as steel, other metallic material, or other suitable rigid materials. In some examples, the scraper 202 may be incompressible or harder than the scouring pad 104 to allow cleaning of different materials from the surface of the grill than the scouring pad 104. Additionally, or alternatively, the scraper 202 may be formed from multiple, individual, incompressible components that can be moved with respect to one another to provide cleaning functionality for the scraper 202.

Figure 3:
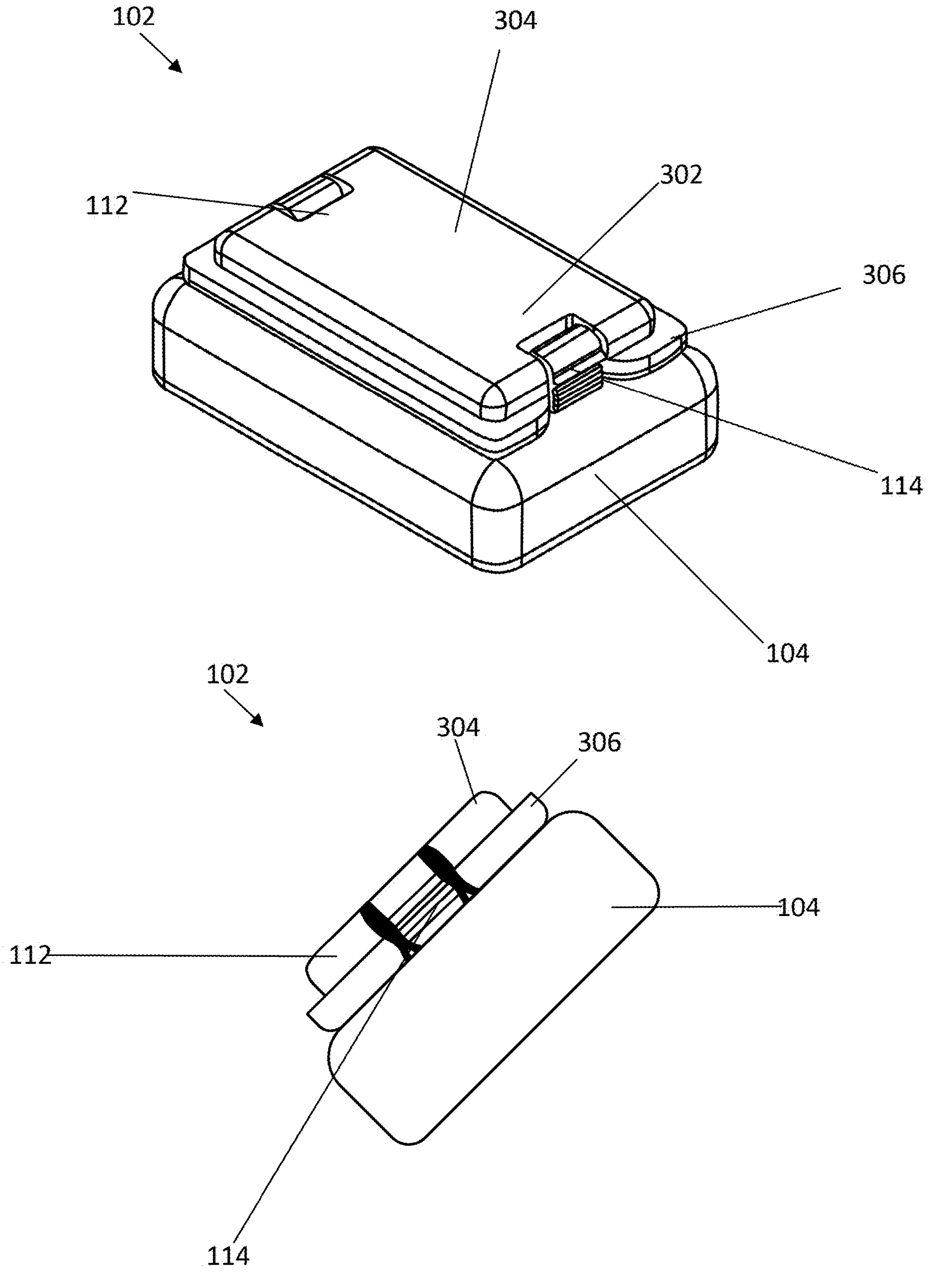
FIG. 3 is a set of views of the grill brush head of the grill brush of FIG. 1.

FIG. 3 is a set of views of the grill brush head 102 of the grill brush 100. For example, FIG. 3 illustrates the grill brush head 102 without the grill brush handle 106 and from a perspective view and a side-perspective view. As illustrated in FIG. 3, the grill brush head 102 can include the scouring pad 104. The scraper 202 is not shown in FIG. 3, as the scraper 202 may be positioned on a side of the grill brush head 102 that is not shown in FIG. 3. In other examples, the scraper 202 may be positioned on any suitable surface of the grill brush head 102 including those illustrated in FIG. 3.

As additionally illustrated in FIG. 3, the grill brush head 102 may include the head connecting end 112. In some examples, the head connecting end 112 can be part of the grill brush head 102, and in other examples, the head connecting end 112 can be coupled with the grill brush head 102. In some embodiments, the head connecting end 112 can include the clip 114 that can be used to couple the head connecting end 112 with the grill brush head 102. Additionally, or alternatively, the head connecting end 112 can include one or more mechanical coupling features such as mechanical coupling feature 302 that can be used to affix the head connecting end 112 to the grill brush head 102 or the scouring pad 104 thereof. Some examples of the mechanical coupling feature 302 can include a screw, a bolt, a rivet, a weld, and the like.

The head connecting end 112 can include a top component 304 and a bottom component 306. In some embodiments, the top component 304 may be part of the head connecting end 112, and the bottom component 306 may be part of the grill brush head 102. In other embodiments, the top component 304 and the bottom component 306 may be part of the grill brush head 102. The top component 304 may be affixed to the bottom component 306 via the mechanical coupling feature 302, via the clip 114, or via a combination thereof.

Figure 4:
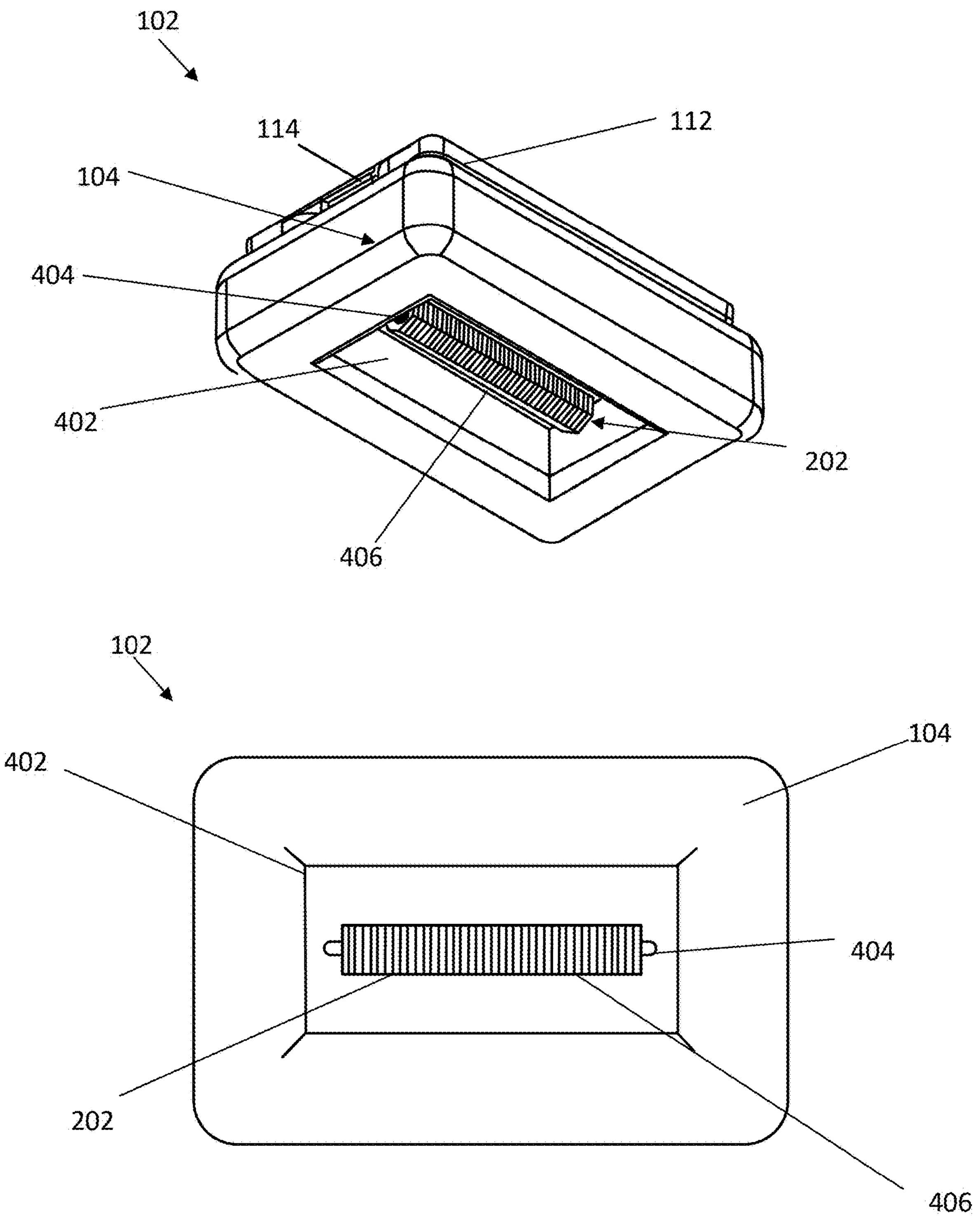
FIG. 4 is a set of views of the grill brush head of the grill brush of FIG. 1.

FIG. 4 is a set of views of the grill brush head 102 of the grill brush 100. For example, FIG. 4 illustrates a bottom view and a bottom-perspective view of the grill brush head 102. As illustrated in FIG. 4, the grill brush head 102 can include the scouring pad 104 and the scraper 202. Additionally, or alternatively, the grill brush head 102 can include the head connecting end 112 that can enable coupling between the grill brush head 102 and the grill brush handle 106 of the grill brush 100.

As illustrated in FIG. 4, the scouring pad 104 may form a cavity 402 in which the scraper 202 can be positioned. While illustrated as a rectangle, the cavity 402 may have any other suitable shape such as square, circular, elliptical, etc. In some examples, the shape of the cavity may be geometrically similar to the shape of the scouring pad 104, though in other examples, the shape of the cavity may at least slightly differ from the shape of the scouring pad 104. For example, and as illustrated in FIG. 4, the shape of the cavity 402 is rectangular, and the shape of the scouring pad 104 is also rectangular.

The scraper 202 may be positioned at least partially within the cavity 402. For example, the cavity 402 may surround at least two sides of the scraper 202. As illustrated in FIG. 4, the scraper 202 may be positioned entirely within the cavity 402, and the cavity 402 may surround four sides, or each side, of the scraper 202. In some examples, the scraper 202 can include a support 404 and a set of rigid discs 406. The support 404 may be at least partially located in the cavity 402, and the support can have a U-shape or other suitable shapes. Additionally, or alternatively, the set of rigid discs 406 can be mounted on the support 404. At least some rigid discs of the set of rigid discs 406 can be moved relative to adjacent rigid discs. For example, each rigid disc of the set of rigid discs 406, or any subset thereof, can be loosely mounted and hanging on the support 404 to allow partial motion of the rigid discs. Additionally, or alternatively, at least some rigid discs of the set of rigid discs 406 can be formed from metal.

FIGS. 5-14 illustrate different views of the grill brush head 102 as described above.

Figure 5:
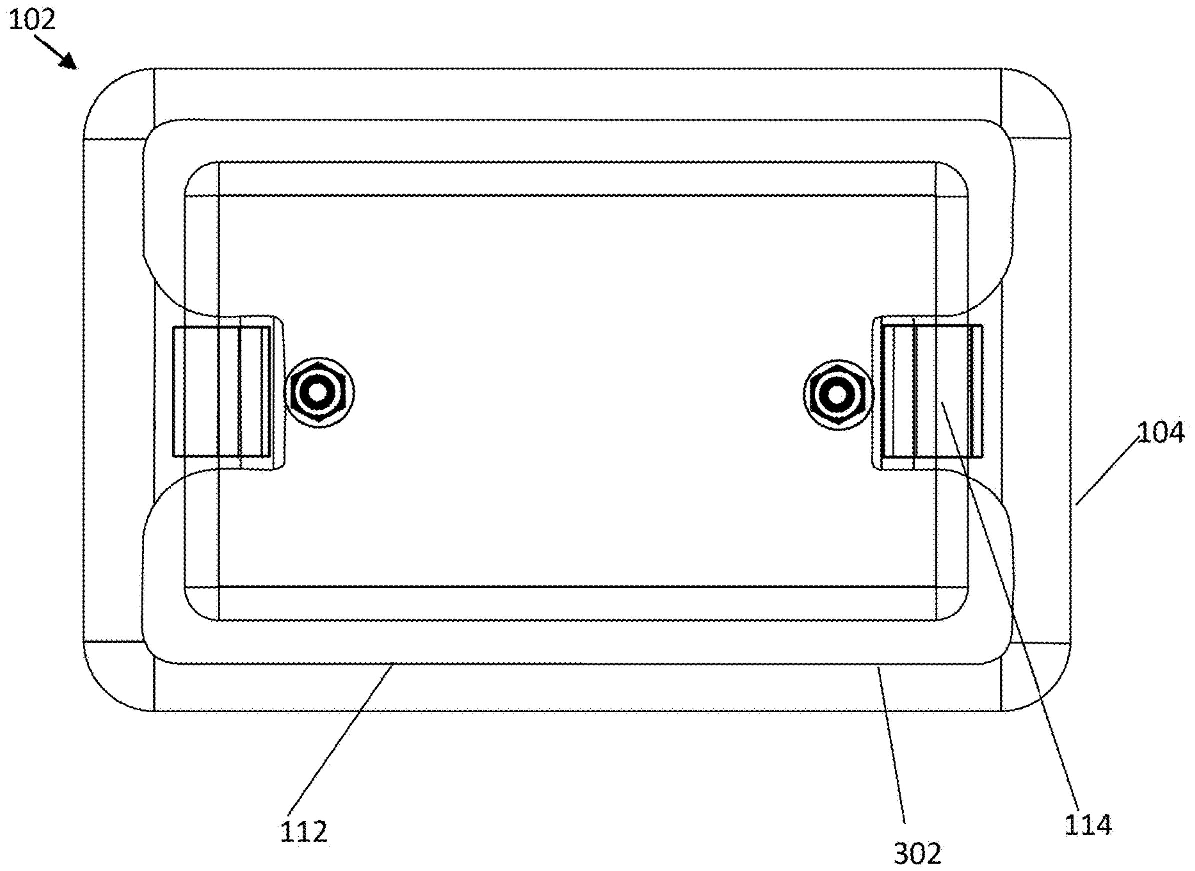
FIG. 5 is a top view of the grill brush head of the grill brush of FIG. 1.

FIG. 5 is a top view of the grill brush head 102 of the grill brush 100. As illustrated in FIG. 5, the grill brush head 102 can include or otherwise be coupled with the head connecting end 112, such as via the clip 114 or the mechanical coupling feature 302, and can include the scouring pad 104.

Figure 6:
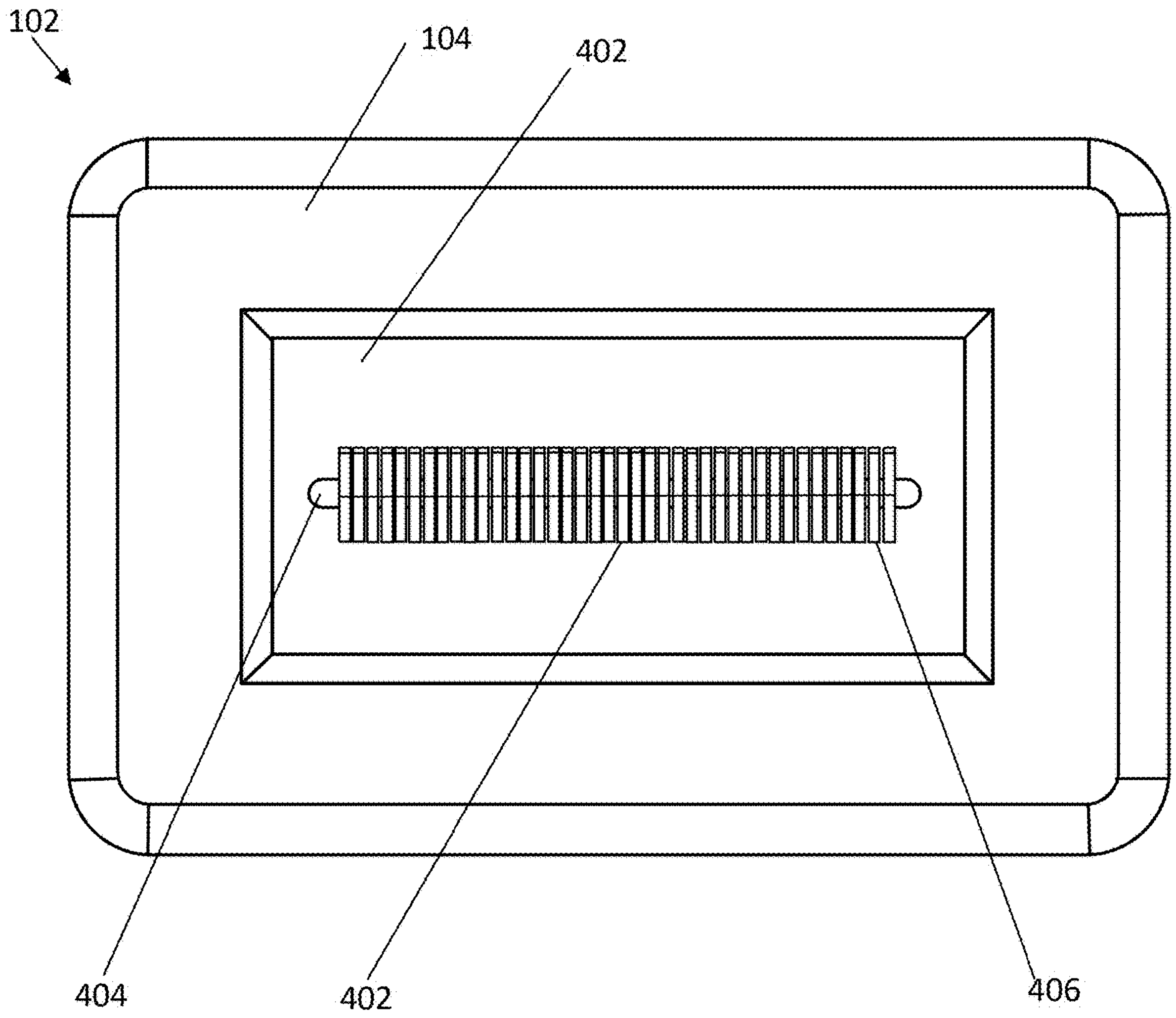
FIG. 6 is a bottom view of the grill brush head of the grill brush of FIG. 1.

FIG. 6 is a bottom view of the grill brush head 102 of the grill brush 100. As illustrated in FIG. 6, the grill brush head 102 can include the scouring pad 104 and the scraper 202. The scouring pad 104 can form the cavity 402 in which the scraper 202 can be located. Additionally, or alternatively, the scraper 202 can include the support 404 and the set of rigid discs 406. As illustrated in FIG. 6, the scouring pad 104 and the scraper 202 can be located on a common side, such as an underside, of the grill brush head 102.

Figure 7:
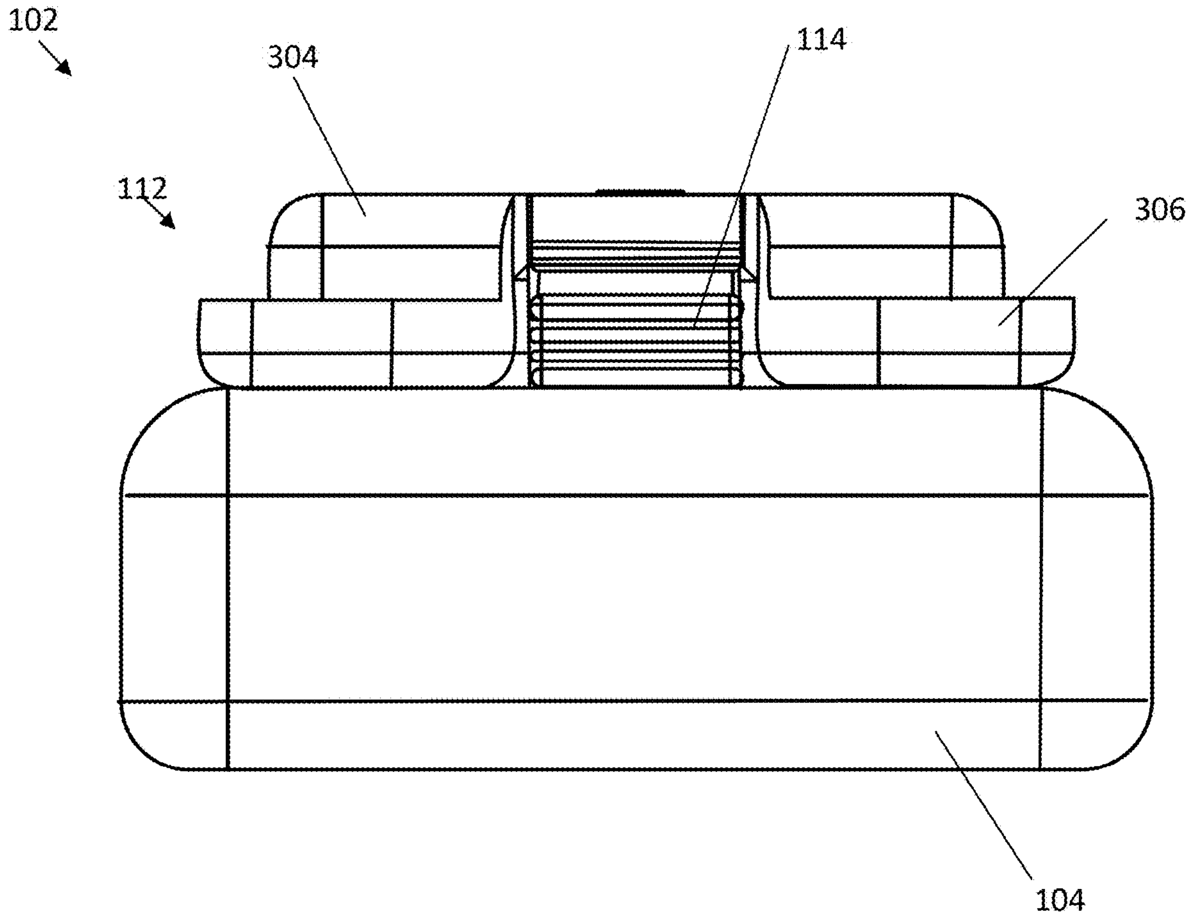
FIG. 7 is a left-side view of the grill brush head of the grill brush of FIG. 1.

FIG. 7 is a left-side view of the grill brush head 102 of the grill brush 100. As illustrated in FIG. 7, the grill brush head 102 can include the scouring pad 104 and the head connecting end 112. The head connecting end 112 can include the top component 304 and the bottom component 306, and the head connecting end 112 can include the clip 114. In some examples, the clip 114 can be used to couple the top component 304 to the bottom component 306 or the head connecting end 112 to the scouring pad 104.

Figure 8:
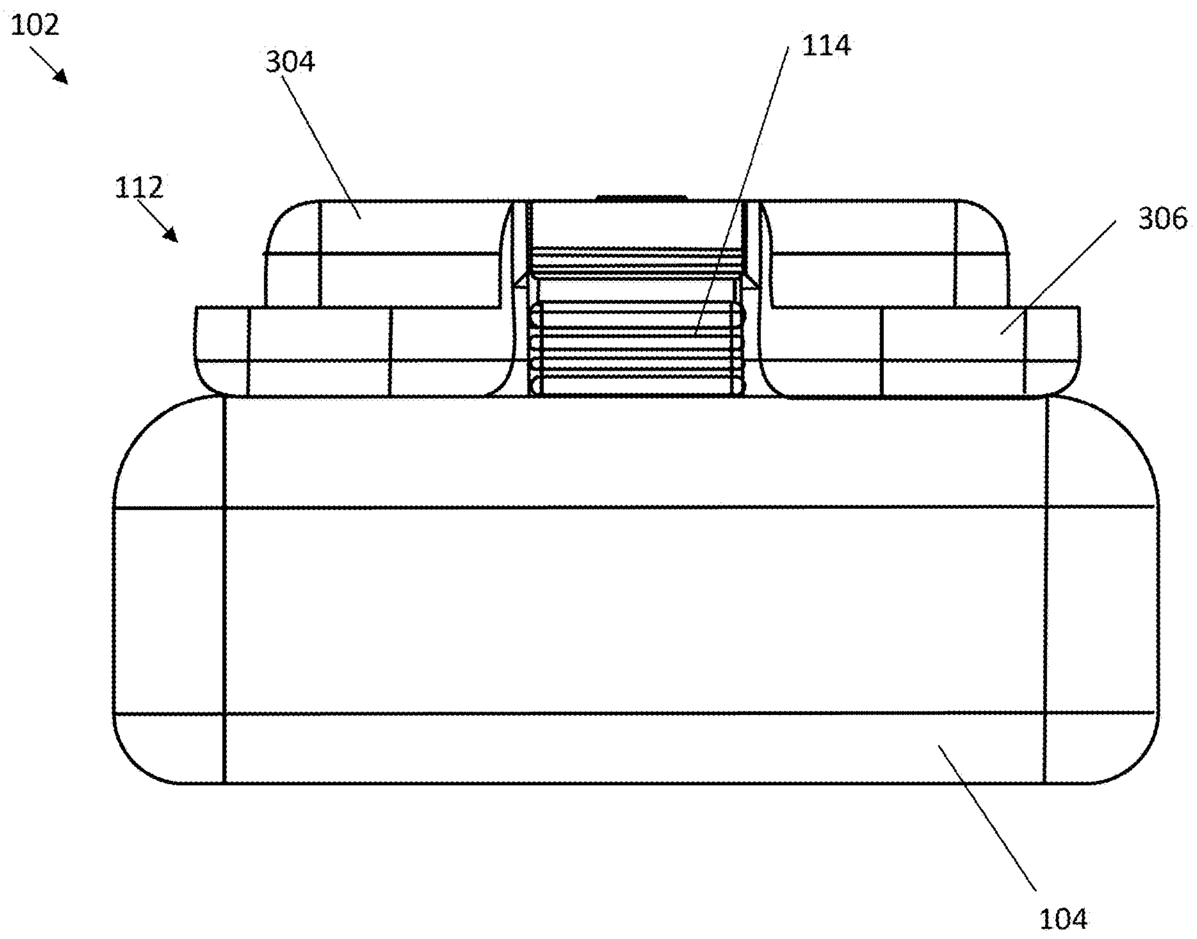
FIG. 8 is a right-side view of the grill brush head of the grill brush of FIG. 1.

FIG. 8 is a right-side view of the grill brush head 102 of the grill brush 100. As illustrated in FIG. 8, the grill brush head 102 can include the scouring pad 104 and the head connecting end 112. The head connecting end 112 can include the top component 304 and the bottom component 306, and the head connecting end 112 can include the clip 114. In some examples, the clip 114 can be used to couple the top component 304 to the bottom component 306 or the head connecting end 112 to the scouring pad 104.

Figure 9:
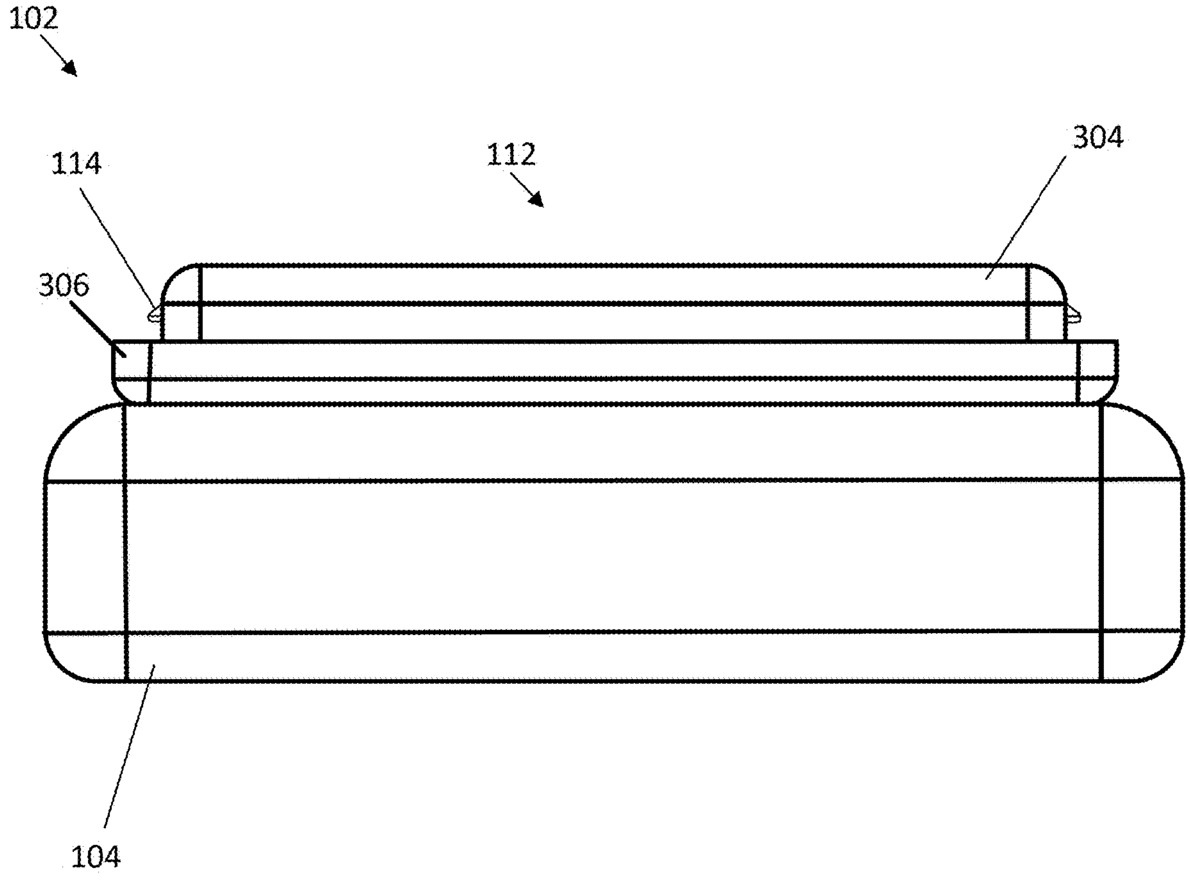
FIG. 9 is a front view of the grill brush head of the grill brush of FIG. 1.

FIG. 9 is a front view of the grill brush head 102 of the grill brush 100. As illustrated in FIG. 9, the grill brush head 102 can include the scouring pad 104 and the head connecting end 112. The head connecting end 112 can include the top component 304 and the bottom component 306, and the head connecting end 112 can include the clip 114. In some examples, the clip 114 can be used to couple the top component 304 to the bottom component 306 or the head connecting end 112 to the scouring pad 104.

Figure 10:
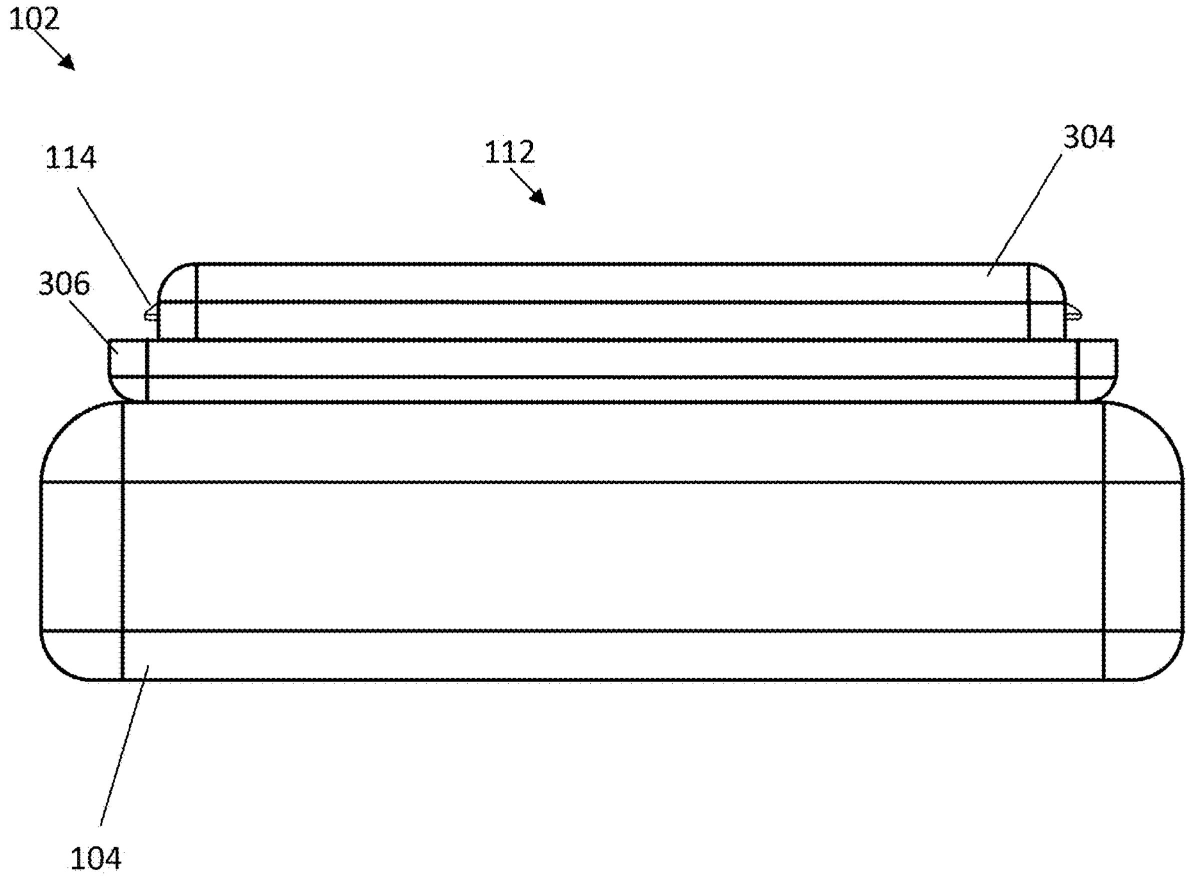
FIG. 10 is a back view of the grill brush head of the grill brush of FIG. 1.

FIG. 10 is a back view of the grill brush head 102 of the grill brush 100. As illustrated in FIG. 10, the grill brush head 102 can include the scouring pad 104 and the head connecting end 112. The head connecting end 112 can include the top component 304 and the bottom component 306, and the head connecting end 112 can include the clip 114. In some examples, the clip 114 can be used to couple the top component 304 to the bottom component 306 or the head connecting end 112 to the scouring pad 104.

Figure 11:
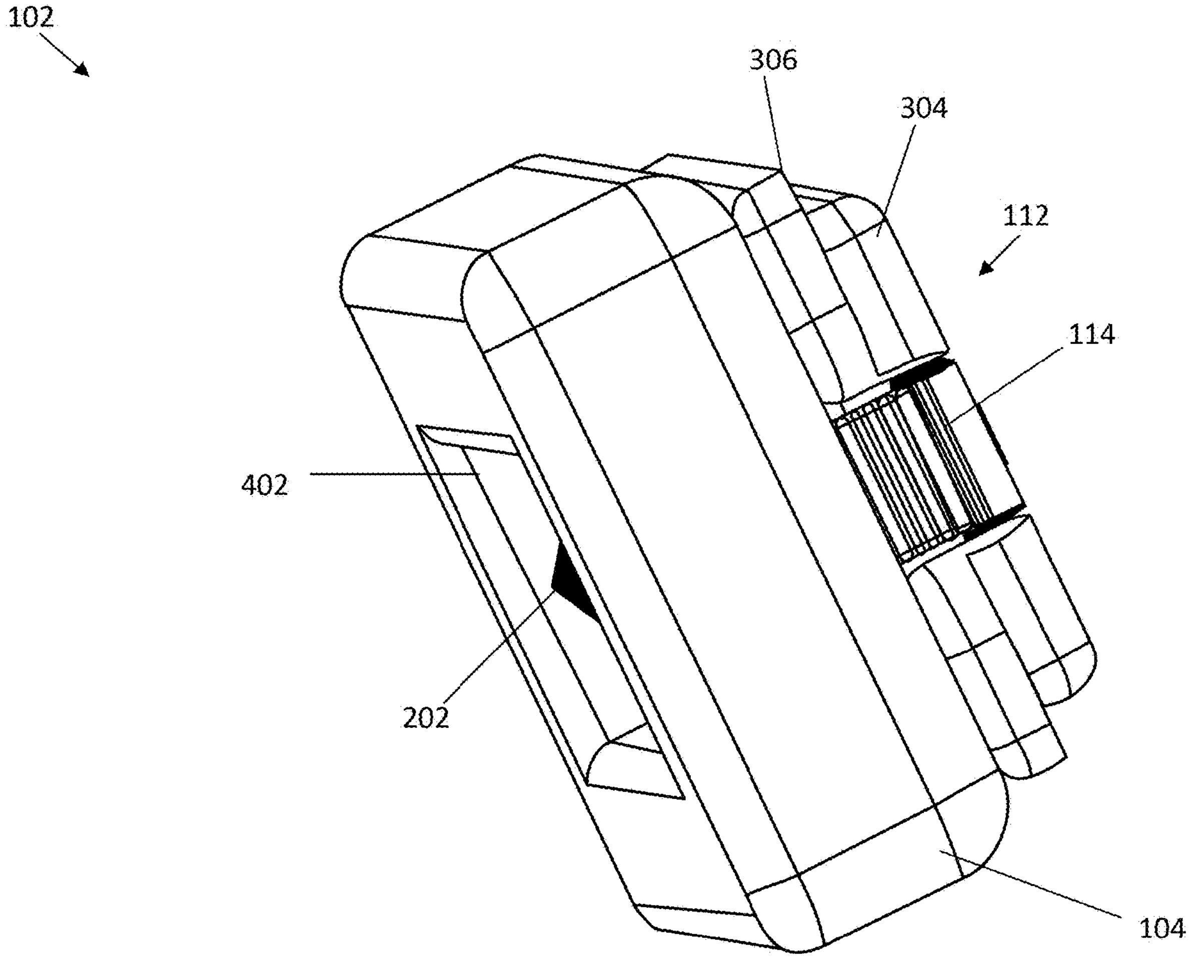
FIG. 11 is a perspective view of the grill brush head of the grill brush of FIG. 1.

FIG. 11 is a perspective view of the grill brush head 102 of the grill brush 100. As illustrated in FIG. 11, the grill brush head 102 can include the scouring pad 104, the scraper 202, and the head connecting end 112. The scouring pad 104 can form the cavity 402 in which the scraper 202 can be located. The head connecting end 112 can include the top component 304 and the bottom component 306, and the head connecting end 112 can include the clip 114. In some examples, the clip 114 can be used to couple the top component 304 to the bottom component 306 or the head connecting end 112 to the scouring pad 104.

Figure 12:
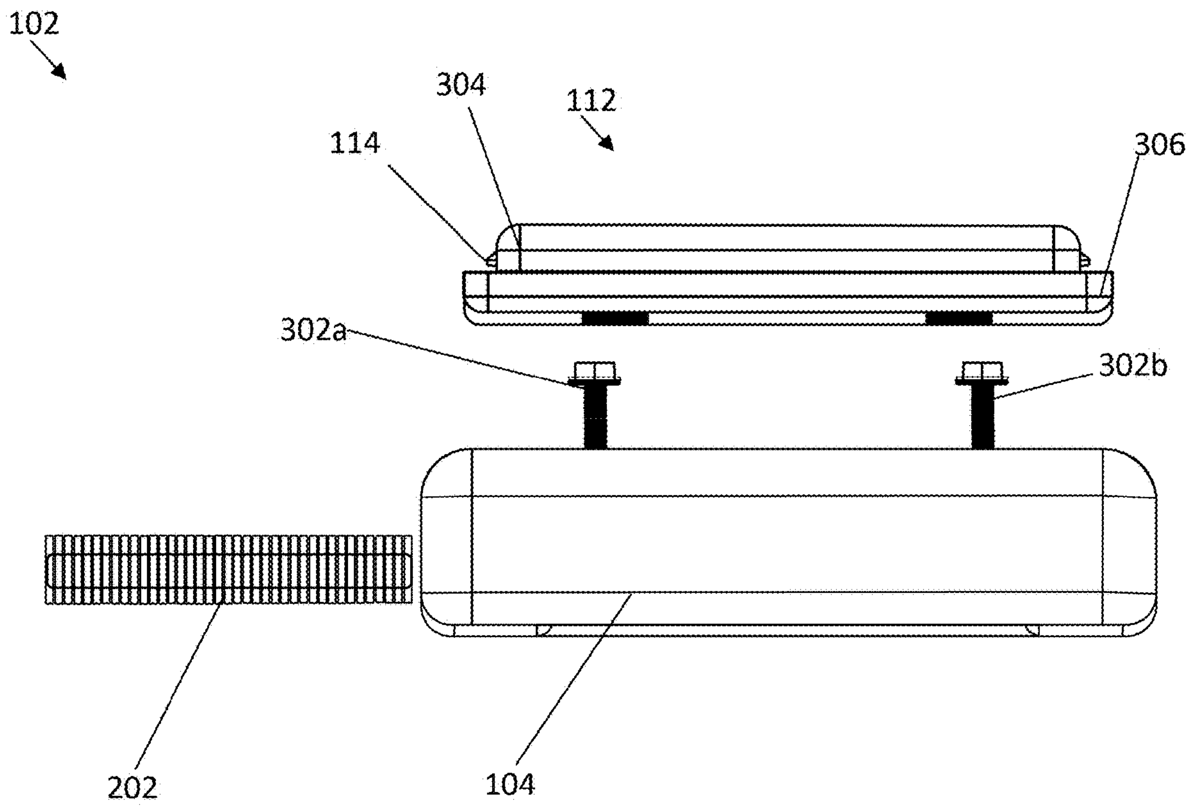
FIG. 12 is a front, exploded view of the grill brush head of the grill brush of FIG. 1.

FIG. 12 is a front, exploded view of the grill brush head 102 of the grill brush 100. As illustrated in FIG. 12, the grill brush head 102 can include the head connecting end 112, the scouring pad 104, and the scraper 202. The head connecting end 112 can be coupled with the scouring pad 104 using a first mechanical coupling feature 302*a* and a second mechanical coupling feature 302*b*. The scraper 202 can be positioned within a cavity 402 of the scouring pad 104 on an underside of the grill brush head 102.

Figure 13:
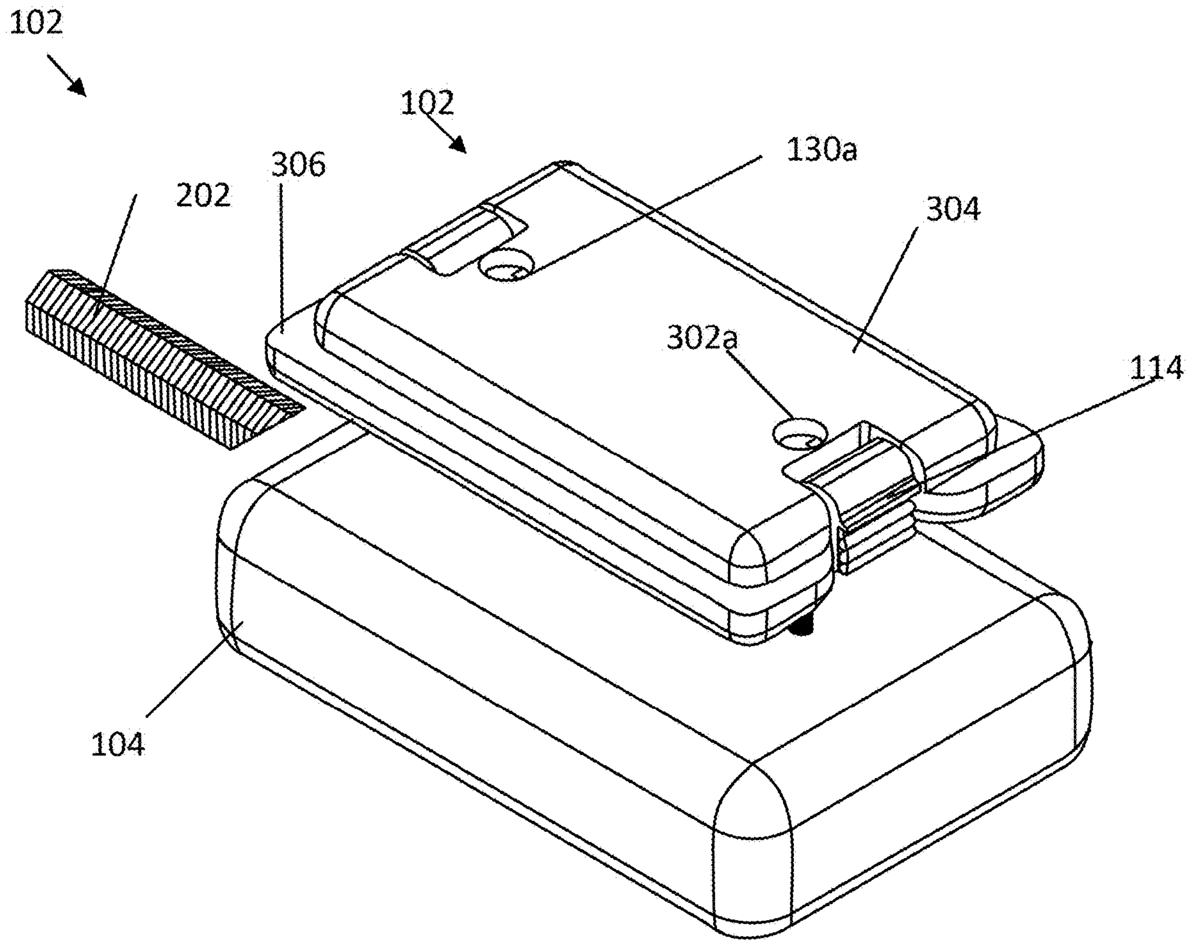
FIG. 13 is a perspective, exploded view of the grill brush head of the grill brush of FIG. 1.

FIG. 13 is a perspective, exploded view of the grill brush head 102 of the grill brush 100. As illustrated in FIG. 13, the grill brush head 102 can include the head connecting end 112, the scouring pad 104, and the scraper 202. The head connecting end 112 can be coupled with the scouring pad 104 using a first mechanical coupling feature 302*a* positioned through a first coupling hole 1302*a* and a second mechanical coupling feature 302*b* positioned through a second coupling hole 1302*b*. The scraper 202 can be positioned within a cavity 402 of the scouring pad 104 on an underside of the grill brush head 102.

Figure 14:
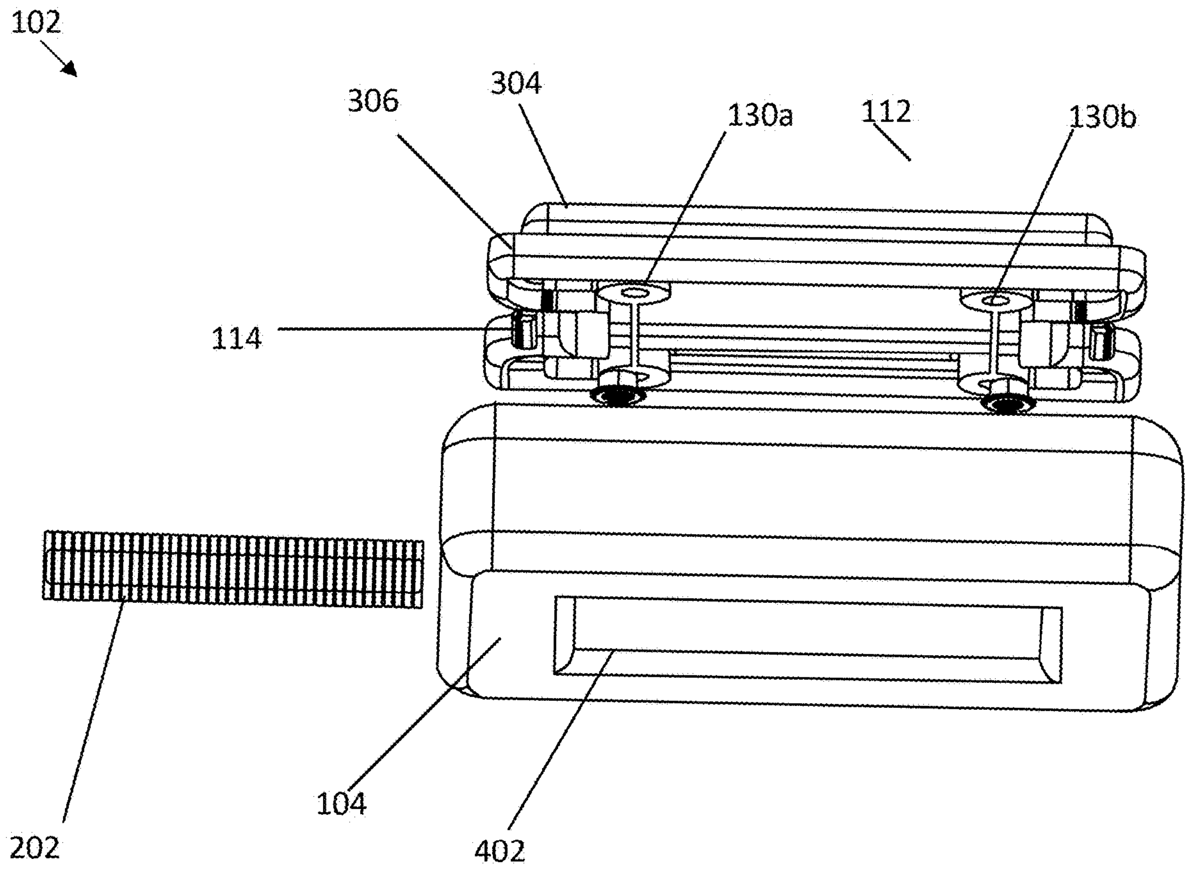
FIG. 14 is a bottom-perspective, exploded view of the grill brush head of the grill brush of FIG. 1.

FIG. 14 is a bottom-perspective, exploded view of the grill brush head 102 of the grill brush 100. As illustrated in FIG. 14, the grill brush head 102 can include the head connecting end 112, the scouring pad 104, and the scraper 202. The head connecting end 112 can be coupled with the scouring pad 104 using a first mechanical coupling feature 302*a* positioned through a first coupling hole 1302*a* and a second mechanical coupling feature 302*b* positioned through a second coupling hole 1302*b*. The scraper 202 can be positioned within a cavity 402 of the scouring pad 104 on an underside of the grill brush head 102.

The subject matter of certain embodiments of this disclosure is described with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

It should be understood that different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

What is claimed is:

1. A grill brush comprising:

a bristle-free scouring pad; and a rigid scraper, wherein the bristle-free scouring pad is arranged relative to the rigid scraper to allow simultaneous contact of both the bristle-free scouring pad and the rigid scraper with a grill grate during use, wherein the rigid scraper comprises a support at least partially located in a cavity of the bristle-free scouring pad, wherein the rigid scraper further comprises a plurality of rigid discs mounted on the support, and wherein a rigid disc of the plurality of rigid discs abuts an adjacent rigid disc of the plurality of rigid discs and is movable relative to the adjacent rigid disc to follow a pattern of the grill grate.

2. The grill brush of claim 1, wherein both the bristle-free scouring pad and the rigid scraper are located on an underside of the grill brush, and wherein the bristle-free scouring pad surrounds four sides of the rigid scraper.

3. The grill brush of claim 1, wherein the bristle-free scouring pad is formed at least partially from an aramid cloth.

4. The grill brush of claim 1, wherein the rigid scraper is positioned fully within the cavity.

5. The grill brush of claim 1, wherein at least some of the rigid discs are movable relative to adjacent rigid discs.

6. The grill brush of claim 1, wherein the bristle-free scouring pad is compressible.

7. The grill brush of claim 1, wherein the grill brush comprises a handle and a grill brush head removably attached to the handle, wherein the grill brush head comprises the bristle-free scouring pad and the rigid scraper, wherein the handle is couplable with the grill brush head, wherein the handle comprises a grip end and an elongated shaft, and wherein the grip end has a first thickness that is larger than a second thickness of the elongated shaft.

8. The grill brush of claim 1, wherein a lower-most part of the rigid scraper is approximately coplanar with a lower-most part of the bristle-free scouring pad when the bristle-free scouring pad is in an uncompressed state.

9. The grill brush of claim 1, wherein the bristle-free scouring pad has a wider dimension and a narrower dimension, and wherein the rigid scraper extends parallel to the wider dimension and orthogonal to the narrower dimension.

10. The grill brush of claim 1, wherein the support has a U-shape.

* * * * *